United States Patent [19]

Grimm

[11] 3,851,710

[45] Dec. 3, 1974

[54] HYDRAULIC BEAMING CONTROL SYSTEM FOR PLOW IMPLEMENTS

[75] Inventor: William L. Grimm, Wheaton, Ill.

[73] Assignee: International Harvester Company, Chicago, Ill.

[22] Filed: Sept. 19, 1973

[21] Appl. No.: 398,745

[52] U.S. Cl. .................. 172/294, 172/316, 172/406, 172/421, 172/473
[51] Int. Cl. ...................... A01b 3/00, A01b 63/22
[58] Field of Search .......... 172/293, 294, 316, 395, 172/400, 406, 421, 473; 280/43.13, 43.23, 414.5

[56] References Cited
UNITED STATES PATENTS

| | | | |
|---|---|---|---|
| 2,611,306 | 9/1952 | Strehlow et al. | 172/294 X |
| 2,722,804 | 11/1955 | Stickney | 172/294 X |
| 2,830,519 | 4/1958 | Chandler et al. | 172/294 X |
| 2,968,356 | 1/1961 | Mydels | 172/473 X |
| 3,209,839 | 10/1965 | Morkoski et al. | 172/405 |
| 3,762,480 | 10/1973 | Hofer | 172/4 |

Primary Examiner—Robert E. Pulfrey
Assistant Examiner—Paul T. Sewell
Attorney, Agent, or Firm—F. David AuBuchon; Floyd B. Harman

[57] ABSTRACT

A hydraulic beaming control system for tractor-propelled plow implements having sequentially arranged frame-mounted plow units and by means of which a delay is afforded in either raising or lowering the rear end of the frame, to the end that the forward plow units will leave the ground or enter the ground before the rear plow units. A single directional control valve on the tractor cooperates with a single relief valve on the plow frame in sequentially actuating front and rear lift cylinders in timed relationship. With split, articulated tandem-arranged plow frames having a medially disposed lift cylinder which raises and lowers the central portion of the split frame, a modified form of the control system provides an additional relief valve, the two relief valves functioning automatically under the control of the single tractor-mounted valve to actuate the front, medial and rear lift cylinders sequentially and in the order named, whether frame raising or frame lowering operations are being initiated.

10 Claims, 3 Drawing Figures

PATENTED DEC 3 1974          3,851,710

HYDRAULIC BEAMING CONTROL SYSTEM FOR PLOW IMPLEMENTS

The improved hydraulic control system comprising the present invention has been designed for use primarily in connection with tractor-impelled, trail-behind, moldboard plows of the type which are provided with either a rigid or an articulated sectional plow frame which serves to support a series of sequentially arranged plow bottoms, the function of the system being to control the inclination of the frame, or its sections, during frame-raising and frame-lowering operations in order that there will be a successive movement of the various plow bottoms of units with the leading plow unit being the first to leave the ground during frame-raising operations, and also being the first to enter the ground during frame-lowering operations. The invention is however capable of other uses and hydraulic control systems embodying the principles of the present invention may, if desired, with or without modification as required, be employed in connection with other forms of plow implements, whether the same be of the trail-behind or semi-mounted type. Irrespective however of the particular use to which the invention may be put, the essential features thereof are at all times preserved.

When cultivating crops with tractor-impelled plow implements it is desirable that, when either raising or lowering of the plow units from or into the ground, the forward plow unit shall leave or enter the ground before the rear plow unit, the preferred way of accomplishing this being to raise the front end of the plow-supporting frame above the level of the rear end thereof so that the plow units when considered collectively, will leave the ground on a slight upward incline as the implement travels forwardly during plow-raising operations, and similarly will enter the ground on a slight downward incline during plow-lowering operations. In this manner a more complete cultivation of the various plant rows will take place.

Heretofore, various means have been provided in connection with hydraulic lift apparatus to accomplish such sequential plow lifting operations, one such means embodying separate manually controlled pressure differential valves, there being one such valve for each end or part of the plow frame which is to be raised or lowered. Another such means is predicated upon the use of lift linkage arrangements which are selectively operable and which provide greater resistance to lifting one portion of the plow frame than another portion thereof. In some implements, such means are employed in combination with each other to effect the desired frame raising and lowering operations. It is obvious that whether such means be employed singly or in combination, constant operator attention is required.

The present invention is designed to overcome the above-noted limitations that are attendant upon the construction and use of conventional hydraulic control systems for effecting plow raising and lowering operations. Toward this end the invention contemplates the provision of a novel control system which, when employed in conjunction with a moldboard or other plow implement having a rigid plow frame or beam which is provided with front and rear hydraulic cylinder-controlled power lift mechanisms, employs a single manually operable, multiposition, tractor-mounted control valve having a frame raising position a frame lowering position, and a neutral position, and a single automatic, plow-mounted, pressure-responsive, spring loaded cushion valve. When the control valve is in its frame-raising position, fluid is supplied to the cushion valve and is immediately directed thereby to the cylinder of the front power lift mechanism to the exclusion of the cylinder of the rear power lift mechanism. When fluid pressure within the cushion valve builds up to an extent sufficient to overcome the pressure requirement (resistance to movement) of such front cylinder, the latter is actuated so as to raise the front end of the plow frame. When fluid pressure within the cushion valve builds up to a degree sufficient to overcome the pressure requirement of the cylinder of the rear power lift mechanism, together with a predetermined added spring pressure which is set into the valve, the fluid is directed to such rear lift cylinder which is then actuated so as to raise the rear end of the plow frame.

When the control valve shifted to its frame-lowering position, the fluid is supplied directly to both lift cylinders in such a manner as to potentially assist both power lift mechanisms in lowering their respective ends of the frame, while at the same time draining the front lift cylinder of fluid through the cushion valve, thereby effecting lowering of the front end of the plow frame. When pressure in the rear lift cylinder builds up to an extent sufficient to overcome a second spring pressure requirement which is set into the cushioning valve, the latter is actuated so as to drain the rear lift cylinder which then functions to lower the rear end of the plow frame. Means are provided for regularly controlling the spring pressure requirements which are set into the cushion valve to compensate for varying plow frame load conditions and consequent lift cylinder requirements, thus adapting the present control system to varying plow frame mass and mass distribution.

The control system of the present invention is, with but slight modification, capable of use in connection with a plow implement having an articulated split plow frame which is provided with a medial hydraulic cylinder-controlled power lift mechanism which is effective at the region of juncture between the tandem arranged front frame section and the rear frame section to raise and lower the rear end of the front frame section and the front end of the rear frame section in unison. In such an instance the control system employs a second and similar pressure-responsive cushion valve on the plow implement, the two cushion valves being so adjusted that when the control valve on the tractor is in its frame-raising position and the first cushion valve has functioned to actuate the front cylinder to raise the front end of the composite plow frame, a further build up of pressure in the first cushion valve to such an extent that it overcomes the pressure requirement of the medial lift cylinder, together with the aforementioned predetermined added spring pressure requirement, causes fluid to be directed to the medial lift cylinder for medial frame-raising purposes. Thereafter, when fluid pressure in the fluid line leading from the first cushion valve to the medial lift cylinder builds up to such an extent that it overcomes the pressure requirement of the rear lift cylinder, together with a predetermined added spring pressure requirement, fluid is directed to the rear lift cylinder to raise the rear end of the composite plow frame.

When the control valve is moved to its frame lowering position, fluid is applied directly to all three lift cylinders in such a manner as to potentially assist their associated power lift mechanisms in lowering their respective regions of the frame while at the same time draining the front lift cylinder of fluid through the first cushion valve, thereby lowering the front end of the composite plow frame. When pressure in the medial lift cylinder builds up to an extent sufficient to overcome the aforementioned second spring pressure requirement of the first cushion valve, such valve is actuated to drain the medial lift cylinder which then functions to lower the medial region of the composite plow frame. When pressure in the rear lift cylinder builds up to such an extent as to overcome a second spring pressure requirement of the second cushion valve, and also the aforementioned second spring pressure requirement of the first cushion valve, both cushion valves function to drain the rear lift cylinder which then functions to lower the rear end of the composite plow frame. Stated otherwise, in the modified form of control system, the medial lift cylinder assumes the same hydraulic relationship to the first cushion valve as does the rear lift cylinder of the control system for a rigid beam plow implement, while the second cushion valve assumes a hydraulic relationship to the fluid line between the first cushion valve and the medial lift cylinder similar to that which the first cushion valve assumes relative to the hydraulic pump which supplies fluid to the first cushion valve.

The provision of a hydraulic control system such as has briefly been outlined above wherein plow raising and lowering operations are accomplished by movement of the operating lever of a single two-position control valve, resulting in fully automatic sequential raising and lowering of the plow units constitutes the principle object of the present invention. By such an arrangement, as soon as the forward plow units have commenced their vertical movement in either direction, the operator may devote his full attention to controlling the tractor with assurance that the rear plow units will commence their verticle movement at the proper time. Other objects and advantages of the invention will become readily apparent as the nature of the invention is better understood.

In the accompanying two sheets of drawings forming a part of this specification, two illustrative embodiments of the invention have been shown.

Figures 1, 2:
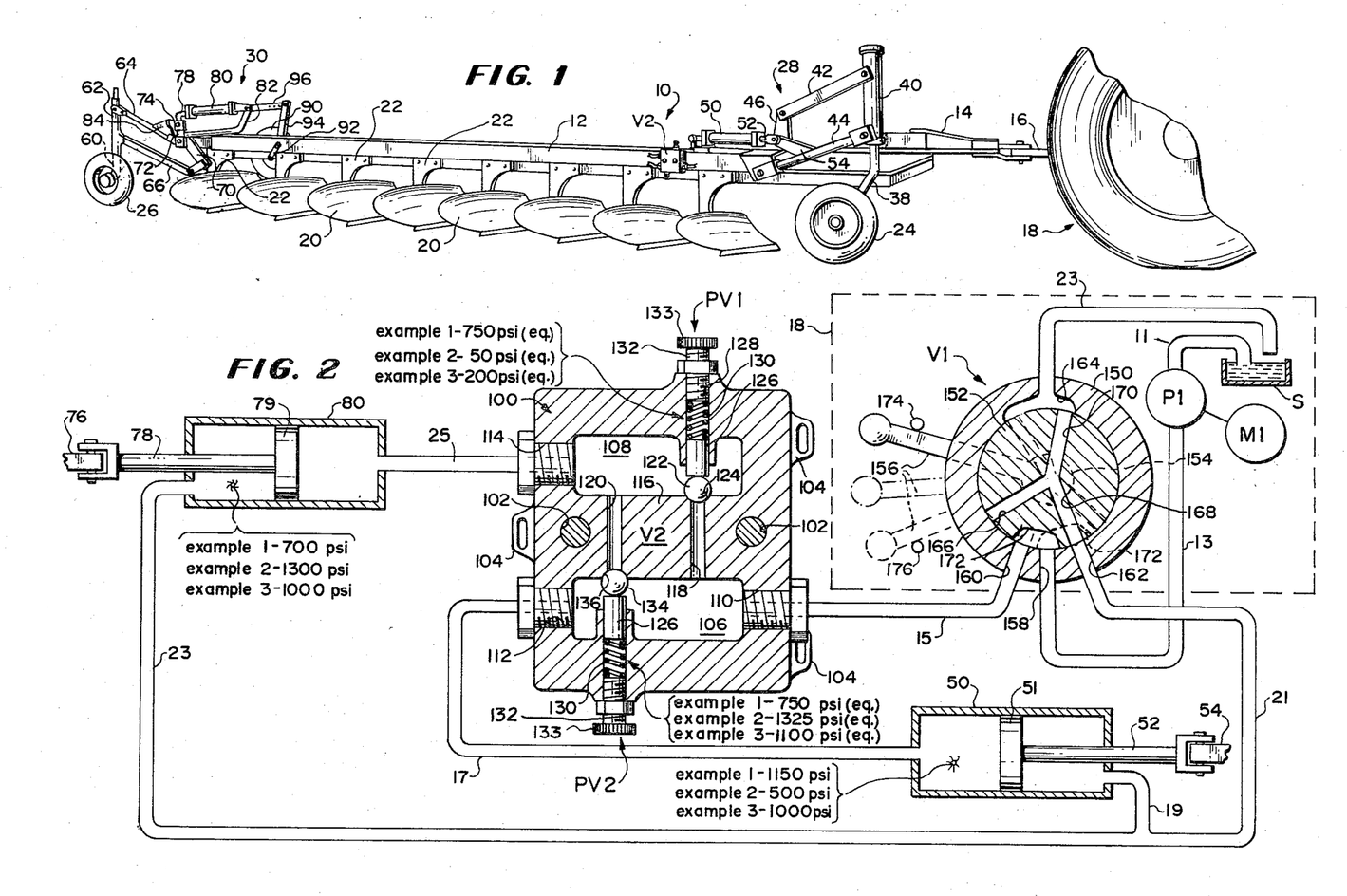
FIG. 1 is a perspective view of a conventional solid-frame multi-bottom moldboard plow with which the hydraulic control system of the present invention is operatively associated and showing the same attached to the drawbar of a tractor.
FIG. 2 is a hydraulic circuit diagram of the system.

Referring now to the drawings in detail and in particular to FIG. 1, a moldboard plow implement embodying the present invention is designated in its entirety by the reference numeral 10 and it embodies a diagonally extending plow frame or bar 12 from which there projects forwardly a hitch structure 14 which is shown as being operatively connected to the drawbar 16 of a tractor 18. The plow frame 12 serves to support therebeneath a plurality of plow units or bottoms 20, each of which is carried at the lower end of a standard 22 which is secured to the plow frame 12. The standard 22 could be connected to the frame 12 through a trip mechanism such as disclosed in U.S. Pat. No. 3,321,027 to Johnson, et al.

The front end of plow frame 12 is supported by a front furrow wheel 24 while the rear end of the frame is supported by a rear furrow wheel 26. Power lift mechanism 28 is provided whereby relative vertical motion between the forward end of the plow frame 12 and the front furrow wheel 24 may be effected and similar power lift mechanism 30 is provided whereby relative vertical motion between the rear end of the plow frame and the rear furrow wheel 26 may be effected. These power mechanisms 28 and 30 are operable independently of each other so that varying degrees of fore and aft inclination may be imparted to the plow frame in a manner and for a purpose that will be set forth presently.

The particular power lift mechanisms 28 and 30 for raising and lowering the front and rear ends respectively of the plow frame 12 constitute no part of the present invention and no claim is made herein to any novelty associated with the same. Various other forms of power lift means may be employed if desired, there being available a wide variety of such arrangements whereby the projection and retraction of a plunger from a hydraulic cylinder will transmit vertical motion to a plow frame. In practice such power lift means will not only vary along the various manufacturers of moldboard and other plows but they also will vary among the different plow models of the same manufacturer. The particular power lift mechanisms 28 and 30 selected for environmental illustration herein is substantially the same as those which are disclosed in U.S. Pat. No. 3,209,839 granted on Oct. 5, 1965 and entitled "HYDRAULIC CONTROLLED GAUGE AND FURROW WHEEL." The power lift mechanisms 28 and 30 are somewhat schematically illustrated in FIG. 1 in that some of the nonessential details thereof have been omitted in the interests of clarity. However, for a more complete understanding of the nature of each of these power lift means, reference may be had to such aforementioned U.S. Pat. No. 3,209,839 which, by reference thereto, is hereby incorporated in and made a part of the present application insofar as it is consistent with the present disclosure.

The front furrow wheel 24 is carried at the lower end of a spindle 38, the latter being rotatable in a sleeve 40 which is pivotally connected at spaced points to the forward ends of a pair of parallel links 42 and 44, the rear ends of the links being pivoted to a Z-shaped bracket 46 which is fixedly mounted on the forward end region of the plow frame 12. A hydraulic cylinder 50 has its rear end pivoted to the frame 12 and is provided with a piston 51 (see also FIG. 2) which is connected to a plunger 52 the forward or outer end of which is pivoted to an arm 54 which is fixedly secured to a medial region of the link 44. The two links 42 and 44, the sleeve 40 and the bracket 46 constitute elements of an articulated four-bar linkage system which approximates a parallelogram, the sleeve 40 constituting a fixed bar of the four-bar linkage since its elevation relative to the ground remains the same, the links 42 and 44 constituting swinging bars, and the bracket 46 constituting a floating bar which shifts substantially vertically and carries the plow frame with it during articulation of the four-bar linkage. It will be apparent therefore that when the plunger 52 is retracted, the position of the four-bar linkage will be such that the bracket 46, and consequently the plow frame 12 will be lowered relative to the furrow wheel 24 and that when the plunger 56 is projected, the plow frame 12 will be raised. The above-described four-bar linkage, together with the cylinder and plunger assembly 50, 52, constitutes the aforementioned power lift mechanism 28. The rear furrow wheel 26 is mounted on the lower end of a spindle 60 which is rotatable in a sleeve 62, the latter bring pivotally connected at spaced points to the rear ends of a parallel links 64 and 66. The forward ends of the links 64 and 66 are pivoted to a connecting link 70. The sleeve 62, and links 64, 66 and 70 thus establish a second or rear four-bar linkage in which the sleeve 62 constitutes a fixed bar, the links 64 and 66 constitute swinging bars, while the link 70 constitutes a floating bar.

An arm 72 is pivotally connected at its lower end to the plow frame 12 and at its upper end to the outer end of a plunger 78. The arm 72 includes an abutment 74 which is arranged to engage a matched abutment 84 fixed to the upper link 64. The plunger 78 is associated with a piston 79 (see FIG. 2) of a hydraulic cylinder 80 which has its forward end pivoted to the upturned end of a bar 82 fixedly secured to the rear end of the plow frame 12.

From the above description it will be apparent that when the plunger 78 moves toward its extended position, the abutment 74 will be forced rearwardly with respect to the plow frame 12 and against the abutment 84, thereby moving the upper link 64 downwardly relative to the plow frame 12 and consequently causing the entire articulated four-bar linkage to swing downwardly. Since the furrow wheel 26 remains at all times in contact with the ground, such movement of the four-bar linkage relative to the plow frame 12 will cause the floating link 70 to become raised, thus carrying with it the rear end of the plow frame. When the plunger 78 assumes its fully extended position, the rear end of the plow frame will assume its elevated transport position. Conversely, when the plunger 78 moves toward its retracted position, the arm 72 and its associated abutment 74 will be swung forwardly and the force of gravity, acting on the plow frame 12, will cause the abutment 84 to follow the forward movement of the abutment 74 until such time as the plow bottoms 20 seek their normal plowing depth, at which time the pressure on the abutment 84 will be relieved and the latter will move away from the abutment 74, thus leaving the plow bottoms 20 in their operative plowing positions.

Such plowing positions of the plow bottoms 20 is determined by the provision of a conventional gauge wheel 90 the raising and lowering movements of which take place in a limited adjusting range under the control of the plunger 78 during its initial projection from the cylinder 80. The operation of the gauge wheel is a function which is incidental to the hydraulic control mechanism of the present invention and which therefore does not require a detailed description. The gauge wheel and its mode of operation are fully disclosed in the aforementioned U.S. Pat. No. 3,209,839 and reference may be had to such patent for a full understanding thereof. For descriptive purposes herein it is deemed sufficient to point out that the gauge wheel axle is mounted on a crank arm 92 which is operable under the control of a rock arm or lever 94, the latter being affixed to the crank arm 92 and having its upper end selectively pivoted to different points on the forward end of a link 96, the rear end of the link being pivoted to the upper end of the aforementioned arm 72. The rear end of the bar 82 constitutes a stop for the abutment 84 on the link 64. When the plunger 78 is fully retracted, the abutment 84 is in engagement with the rear end of bar 82 and is out of contact with the abutment 74 so that adjustment of the operating depth of the plow bottoms 20 does not affect the vertical position of the rear furrow wheel 26 relative to the plow frame 12. When the plunger 78 is fully projected, the abutment 84 is in engagement with abutment 74 so that as the plow frame 12 is raised in the manner previously described the gauge wheel 90 will also be raised from contact with the ground.

According to the present invention, and in order that the front end of the plow frame 12 shall become lowered before the rear end thereof so that the plow bottoms 20 may enter the ground sequentially from front to rear and also in order that the front end of the frame shall become raised before the rear end thereof so that the plow bottoms will emerge from the ground in the same sequence, the front and rear hydraulic cylinders 50 and 80 are sequentially operable under the control of a directional valve V1 (FIG. 2) which is installed in the tractor 18. The valve V1 operates through the medium of a dual relief cushion valve V2 which is effectively interposed between the control valve V1 and each of the two cylinders 50 and 80 and which preferably is mounted at a convenient location on the plow although, if desired, it may be mounted on the tractor. The particular location of the valve V2 on the plow is not critical, it being obvious that the plow frame 12 affords a convenient mounting member for such valve. Furthermore, by positioning the valve on the frame near the forward end thereof and in the vicinity of the front cylinder 50, conservation of the hydraulic lines which is required for operatively connecting the directional control valve V1 on the tractor 18 to the cushion valve V2 is effected.

The hydraulic lines which are employed for connecting the valve V2 to the two cylinders 50 and 80, as well as the lines which extend from the valve V2 to the valve V1 on the tractor have been omitted from FIG. 1 in the interests of clarity. However, a schematic representation of these lines is disclosed in FIG. 2 for reference purposes when the operation of the present control system is set forth. In this latter view, both the cushion valve V2 and the control valve V1 are shown in detail.

The cushion valve V2 is comprised of a valve body 100 having a pair of transverse bores 102 therein by means of which it may be bolted in position to a mounting structure which, in the present instance, is the plow frame 12, and also having slotted ears 104 which may be used for alternative attachment purposes if desired. A pair of valve chambers 106 and 108 are formed in the valve body 100, the chamber 106 being provided with a pair of threaded fluid ports 110 and 112, and the chamber 108 being provided with a single threaded fluid port 114. The provision of the two valve chambers 106 and 108 establishes therebetween a medial partition wall 116. First and second passages 118 and 120 extend transversely through the partition wall 116 and establish communication between the two valve chambers 106 and 108.

The passage 118 has associated therewith an unidirectional pressure relief valve assembly PV1 embodying a valve ball 122 within the chamber 108 and which is pressed against a frusto-spherical valve seat 124, formed on the adjacent rim of the passage 118, by means of a plunger 126 which is slidable in a bore 128, the latter being coaxial with the passage 118. The plunger 126 is yieldingly urged against the ball 122 by means of a spring 130 and the pressure which is exerted on the plunger 126 by the spring is regulated by means of an adjusting screw 132 which is threadedly received in the bore 128 and is provided with a knurled manipulating head 133 exteriorly of the valve body 100.

The passage 120 similarly has associated therewith an unidirectional pressure relief valve assembly PV2 including a ball 134 which is disposed in the chamber 106 and seats against a valve seat 136 formed on the adjacent rim of the passage 120. Pressure of the ball 134 against its seat 136 is effected by means of a pressure regulating assembly including a plunger, spring and adjusting screw, similar to the pressure regulating assembly of the relief valve assembly PV1 and to which identical reference numerals are applied in the drawing.

The cushion valve V2 is functionally reversible, which is to say that hydraulic fluid is adapted to pass through such valve in opposite directions, the valve functioning in one manner during fluid flow therethrough in one direction and functioning in a different manner during fluid flow in the opposite direction. Thus, each of the various ports 110, 112 and 114 is capable of functioning either as an inlet port or as an outlet port, depending upon the direction of fluid flow through the valve.

Considering the valve V2 in its free state, and also under varying conditions of load, fluid under pressure which is admitted to either the port 110 or 112 will flow directly through the valve chamber 106, entering one port and leaving through the other port. Assuming that the fluid is admitted through the port 110, such fluid will leave the valve chamber through the port 112. If the port 112 is connected to a displaceable load so that a back pressure is developed in the chamber 106, the fluid will continue to leave the port 112 until such time as the back pressure exceeds the rated spring pressure which is exerted by the ball 122 against its seat 124. At such time, the ball 122 will become unseated and fluid will flow from the valve chamber 106 through the passage 118 and into the valve chamber 108 from whence it will flow outwardly through the port 114.

Conversely, if fluid under pressure is admitted through the port 114, this fluid will enter the chamber 108 and, at such time as this pressure exceeds the rated spring pressure of the ball 134 against its seat 136, the ball 134 will become unseated and fluid will flow from the chamber 108, through the passage 114 and into the chamber 106, from whence it will flow outwardly through both of the ports 110 and 112.

The control valve V1 is in the form of a conventional directional valve having a cylindrical valve casing 150 within which there is disposed a rotatable valve body 152 having a central hub 154 from which there projects radially outwardly an operating lever 156. The casing 150 is provided with a series of four ports including a single inlet port 158, a pair of distributing outlet ports 160 and 162, and a relatively wide discharge port 164. The ports 158, 160 and 162 are disposed in a narrow circumferential sector of the valve body, while the port 164 is disposed and bridges a similar narrow circumferential sector of the casing which is diametrically opposed to the ports 158, 160 and 162. The rotatable valve body 152 is formed with a Y-shaped passage including three radial branches 166, 168 and 170. The body 152 is further provided with a peripheral bridging recess 172 designed for selective bridging relationship with either the ports 158 and 160 or the ports 158 and 162.

The valve V1 is capable of assuming three positions including an inoperative or closed position wherein the operating lever 156 assumes the mid-position in which it is shown in broken lines, a plow-raising position wherein such lever assumes the full line position in engagement with an abutment or limit stop 174, and a plow-lowering position wherein the lever assumes the dotted line position in engagement with a second abutment or limit stop 176.

In the operation of the valve V1, and assuming that the same is operatively connected in a closed circuit hydraulic system, when the operating lever assumes its full line position as shown in FIG. 2, fluid entering the valve through the port 158 will enter the recess 172 and be discharged through the port 160. At the same time, fluid returning to the valve and entering the same through the port 162 will flow through the branch passages 168 and 170 and be discharged through the port 164. When the lever 156 assumes its dotted line position, fluid entering the valve through the port 158 will enter the recess 172 and be discharged through the port 162 while fluid returning to the valve and entering through the port 160 will flow through the passages 166 and 170 and be discharged through the port 164.

Considering now the application of the valves V1 and V2 to the hydraulic control system of the present invention, the control valve V1, as previously stated, is mounted upon the tractor 18 at a convenient location where it is accessible to the operator. Also mounted on the tractor is a pump P1 which supplies fluid to the valve V1 for selective distribution to the valve V2 which, as also previously stated, is mounted on the plow frame 12. The pump is adapted to be driven from a suitable source of power M1 which may be the tractor engine or a separate electric or hydraulic motor. The pump P1, when actuated withdraws fluid from a sump S and supplies the same while fluid the inlet port 158 of the valve V1 fluid is returned from the valve through the outlet port 164 to the sump S.

The various fluid lines which extend from the pump P1 to the valve V1 and the sump S and from the valve V1 to the valve V2 and to the cylinders 50 and 80 on the plow frame 12 will be specified presently when the operation of the present hydraulic control system is set forth. In general, it is pointed out that such lines as are wholly disposed on the tractor 18 may be in the form of pipe sections and associated fittings such as elbows, tees, etc., while such lines as extend from the valve V1 to the various hydraulic components on the plow 10 will be in the form of lengths of flexible tubing and their associated fittings.

As previously stated, the function of the hydraulic control system of the present invention is to effect sequential lowering of the front and rear ends of the plow frame 12 at the commencement of a given plowing operation to the end that the plow bottoms 20, considered collectively, will enter the ground on an incline with the leading plow bottom engaging and entering the ground first and with succeeding plow bottoms entering the ground sequentially as the rear end of the plow frame becomes lowered and the plow frame 12 levels off to a horizontal position. A further function of the control system is to effect sequential raising of the front and rear ends of the plow frame at the termination of a given plowing operation to the end that the leading plow bottom will leave the soil first followed by a sequential emergence of the remaining plow bottoms which, collectively are thus guided out of the ground.

When considering the present hydraulic control system, it should be borne in mind that when the plow frame 12 is in its fully raised position with all of the plow bottoms being clear of the ground, the entire mass of the frame and its associated plow bottoms is supported on the furrow wheels 24 and 26 so that the weight of the frame is reflected by the fully projected plunger 52 and piston 51 of the front cylinder 50 and also by the fully projected plunger 78 and piston 79 of the rear cylinder 80, thereby maintaining respective fluid pressures in the valve chambers 106 and 108 which are commensurate with the distribution of plow frame mass between the front and rear ends of the plow frame. It should also be understood that with different plows, there will be a difference in plow frame mass, as well as distribution of the mass, and, therefore, to attain the most desirable sequential "beaming" of the plow frame, certain predetermined spring ratings for the pressure relief valves PV1 and PV2 will be imparted to the springs 130 of such valves by manipulation of the adjusting screws 132.

In connection with certain plows, the distribution of plow frame mass is such that the front end of the plow is heavier than the rear end thereof so that the thrust against the plunger 52 of the front cylinder 50 is greater than the thrust against the plunger 78 of the rear cylinder 80. Thus the pressure requirement for moving the plunger 52 to raise the front end of the plow frame 12 is higher than the pressure requirement for moving the plunger 78 to raise the rear end of the plow frame. In certain other plows, plow frame mass distribution is such that the rear end of the frame 12 is heavier than the front end so that the pressure requirement for moving the plunger 52 is less than the pressure requirement for moving the plunger 78. In still other plows where there is equal weight distribution between the ends of the plow frame 12, the pressure requirements for moving the plungers 52 and 78 are substantially equal. In each of these situations spring adjustments may be effected under the control of the adjusting screws 132 to attain the desired beaming of the plow frame, an initial adjustment of both screws sufficing both for plow frame raising and plow frame lowering operations.

In describing the operation of the present hydraulic control system, insofar as it relates to the beaming of a plow implement of the general character described in connection with FIG. 1, three exemplary load characteristics at the front and rear ends of the plow frame 12 will be given, together with appropriate spring rate settings for the relief valve assemblies PV1 and PV2 and by means of which, in each instance, there will be a delayed action of the rear cylinder 80 so as to cause the front end of the plow frame 12 to become raised or lowered as the case may be, before the rear end of the frame. These examples will be predicated upon the three possible situations set forth immediately above, example No. 1 relating to the existence of a front cylinder requirement which is higher than the rear cylinder requirement; example No. 2 relating to the existence of a front cylinder requirement which is lower than the rear cylinder requirement; and example No. 3 relating to the existence of substantially equal cylinder requirements.

| (Example No. 1) | |
|---|---|
| Pressure on front cylinder 50 | 1150 psi |
| Pressure on rear cylinder 80 | 700 psi |
| Equivalent pressure on ball 122 | 750 psi |
| Equivalent pressure on ball 134 | 750 psi |

Assuming that the plow frame 12 is in a lowered plowing position and that at the end of a given plowing operation it is desired to raise the plow bottoms 20 from the ground, the operator of the tractor will move the lever 156 of the control valve V1 to its full line position against the abutment 174, whereupon a hydraulic circuit will exist from the sump S, through fluid line 11, pump P1, line 13, valve V1, line 15, chamber 106 of the valve V2, and line 17 to the rear end of the front cylinder. Since there is a fluid pressure of 700 psi and a spring pressure equivalent to 750 psi acting on the ball 122 of the pressure relief valve assembly PV1, a total pressure of 1,450 psi in the chamber 106 is required to lift the ball 122 from its seat. Thus, with the ball 122 seated, pressure may build up on the chamber 106 and fluid line 17 until it reaches the 1,150 psi necessary to move the piston 51 and plunger 52 forwardly to thereby actuate the power lift mechanism 28 (FIG. 1) and raise the front end of the plow frame 12 in the manner previously described. During forward movement of the piston 51, fluid on the forward side of the piston will return to the sump S through fluid lines 19, 21, valve V1 and line 23.

As soon as the piston 51 reaches the end of its forward stroke, the pressure in the chamber 106 of the valve V2 continues to rise until such time as it exceeds the 700 psi requirement of the cylinder plus the equivalent spring pressure on the ball 122. At this time the ball 122 will become unseated so that fluid may flow through the passage 118 and into the valve chamber 108. This pressure is then applied to the cylinder 80 through line 25, thus moving the piston 79 and plunger 78 so as to actuate the power lift mechanism 30 (FIG. 1) and raise the rear end of the plow frame 12. During rearward movement of the piston 79 fluid will return to the sump S through lines 23, 21, valve V1 and line 23.

When it is desired to again lower the plow frame 12, the operator of the tractor will shift the lever 156 of the valve V1 to its dotted line position against the stop 176, whereupon fluid in the rear end of the front cylinder 50 will be drained to the sump S through line 17, valve V2, line 15, control valve V1 and line 23, thus lowering the front end of the plow frame 12. With lever 156 against stop 176 fluid under pressure enters valve V1 through port 158 and flows through recess 172 into port 162 and through line 21 into the rod end of hydraulic cylinder 50. During such draining of the front cylinder 50, the spring 130 which is associated with the pressure relief valve PV2 and which exerts a pressure on the ball 134 equivalent to 750 psi in addition to the hydraulic pressure in chamber 106 is effective to maintain the plunger 78 of the cylinder 80 projected so that the rear end of the plow frame 12 remains elevated for the length of time that is required for retracting piston 51. Thereafter, the hydraulic pressure in chamber 106 declines and fluid pressure builds up in the rear side of the cylinder 80 by reason of the hydraulic circuit which extends from the sump S, through line 11, valve V1 and lines 21, 23. As soon as this pressure in the cylinder 80 overcomes the 750 equivalent psi spring pressure, the piston and its plunger move forwardly in the cylinder 80 thus lowering the rear end of the plow frame 12, while at the same time fluid in the forward region of such cylinder is conducted to the sump through line 25, chamber 108 of the valve V2, passage 120, chamber 106, line 15, valve V1, and line 21.

(Example No. 2)

| | |
|---|---|
| Pressure on front cylinder 50 | 500 psi |
| Pressure on rear cylinder 80 | 1300 psi |
| Equivalent pressure on ball 122 | 50 psi |
| Equivalent pressure on ball 134 | 1325 psi |

Inasmuch as the hydraulic circuits extending from the sump S to the front and rear cylinders 50 and 80 respectively remain precisely the same as those described in connection with Example 1, it is not deemed necessary to repeat their description when considering the values which are set forth for Example No. 2.

Ordinarily, with front and rear cylinder values such as are given in Example No. 2, since the front cylinder 50 has a pressure requirement which is less than that of the rear cylinder 80, and with the cylinders connected in parallel, in the absence of the valve V2, upon raising the plow frame 12 from its plowing position the cylinder would cause the front end of the plow frame to rise as soon as its 500 psi pressure requirement was exceeded. Thereafter the rear end of the plow frame would commence to rise as soon as the 1,300 psi pressure requirement was attained. This is desirable. However upon lowering the plow frame, the rear end of the plow frame 12 would be the first to descend, this being undesirable.

According to the present system, and with the appropriate spring values set into the pressure relief valve assemblies PV1 and PV2, initial movement of the lever 156 of the control valve V1 to its full line plow frame raising position will cause fluid to be conducted directly through the chamber 106 of the valve V2 for an initial application of fluid pressure to the piston 51 of the cylinder 50. At such time as this pressure exceeds the 500 psi requirement of such cylinder, the plunger 52 will be extended, thus raising the front end of the plow frame. At such time as the internal pressure in the chamber 106 reaches 1,350 psi so as to overcome the 1,300 psi pressure requirement of the rear cylinder 80, plus the equivalent 50 psi spring pressure on the ball, the piston 79 and plunger 78 will shift rearwardly, thus actuating the power lift mechanism 30 and raising the rear end of the plow frame 12.

In order to lower the plow frame 12, the lever 156 of the control valve V1 will be moved to its dotted line position and, at this time, the hydraulic pressure in chamber 106 in addition to the equivalent 1,325 psi pressure of the ball 134 of the pressure relief valve PV2 against its seat 136 maintains ball 134 against its seat 136, thus holding the plunger 78 of the rear cylinder 80 extended and, consequently, the rear end of the plow frame 12 elevated. The setting of the valve V1 is such that the chamber 106 is drained of fluid, thus retracting the plunger 52 and causing the front end of the plow frame 12 to become lowered. After retraction of the plunger 52, hydraulic pressure in chamber 106 diminishes and the pressure in the rear side of the cylinder 80 builds up through the fluid lines 21, 23, as previously described in connection with Example No. 1, until it is capable of unseating the ball 134 of the pressure relief valve PV2, after which the front end of the cylinder 80 is bled to the sump through the valve chamber 108, passage 120, valve chamber 106 and control valve V1 as previously set forth.

(Example No. 3)

| | |
|---|---|
| Pressure on front cylinder 50 | 1000 psi |
| Pressure on rear cylinder 80 | 1000 psi |
| Equivalent pressure on ball 122 | 200 psi |
| Equivalent pressure on ball 134 | 1100 psi |

Ordinarily with front and rear cylinder values such as are given in Example No. 3 and with the cylinders connected in parallel, theoretically there would be a tendency for both ends of the plow frame 12 to be raised and lowered in unison. However in actual practice it is seldom that such precise cylinder loading takes place.

Furthermore, with cylinders of approximately equal value, changing frictional characteristics and other factors may tip the scale in either direction so that under certain conditions the front end of the plow frame 12 will shift before the rear end and vice versa. Particularly when lifting the plow bottoms out of the ground, unequal ground pressure on the bottoms as they plow through the earth and factors such as ground speed may influence the sequence of front and rear end raising of the plow frame. A lessening of downward pressure on either end of the plow frame will relieve its respective lift cylinder of a certain amount of back pressure and the tendency for such cylinder thereafter is to shift to completion before the other cylinder commences to shift.

With the present system, by a judicious selection of spring values for the pressure relief valves PV1 and PV2, as exemplified in the table of values set forth above, when raising the plow frame 12, initial movement of the lever to its full line position will direct fluid through the valve chamber 106 to the rear end of the cylinder 50, such fluid gradually building up to a pressure slightly in excess of 1,000 psi so as to project the plunger 52 and raise the front end of the plow frame 12. This pressure is maintained in the valve chamber 106 due to the combined pressure requirement of 1,000 psi of the rear cylinder 80 and the equivalent spring pressure on the ball of the pressure relief valve PV1 amounting to 200 psi. After the plunger 52 is fully extended and the front end of the plow frame is raised, an additional build up of pressure in the chamber 106 in excess of the combined pressure requirement of 1,000 psi for the rear cylinder 80 and the equivalent spring pressure of 200 on the ball 122 (totaling 1,200 psi) will unseat the ball and pressurize the chamber 108. This 1,200 psi pressure is in excess of the pressure required to overcome the requirement of the rear cylinder 80 and, as a consequence, immediately after unseating of the ball 122 the plunger 78 becomes extended, thus raising the rear end of the plow frame 12. In example No. 3, the equivalent spring pressure of 200 psi on the ball 122 is the delaying factor which retards the movement of the plunger 78 until after the plunger 52 has become extended. Stated otherwise, the initial build up of 1,000 psi in the chamber 106 is sufficient to overcome the 1,000 psi requirement for the front cylinder 50. However, it requires a pressure build up of 1,200 in the chamber 108 to overcome the 1,000 psi requirement of the rear cylinder 80. Since the ball 122 will not admit fluid from the chamber 106 to the chamber 108 until an additional 200 psi has been generated in the chamber 106, the time which is required to do this occasions a sequential actuation of the plunger 78 which raises the rear end of the plow frame.

In order to lower the plow frame 12, the lever 156 of the control valve V1 will be moved to its dotted line position and, at this time, the hydraulic pressure in chamber 106 in addition to the equivalent 1,100 psi pressure of the ball 134 of the pressure relief valve PV2 against its seat 136 maintains ball 134 against its seat 136, thus holding the plunger 78 of the rear cylinder 80 extended and, consequently, the rear end of the plow frame 12 elevated. The setting of the valve V1 is such that the chamber 106 is drained of fluid, thus retracting the plunger 52 and causing the front end of the plow frame 12 to become lowered. After retraction of the plunger 52, hydraulic pressure in chamber 106 diminishes and the pressure in the rear side of the cylinder 80 builds up through the fluid lines 21, 23, as previously described in connection with Example No. 1, until it is capable of unseating the ball 134 of the pressure relief valve PV2, after which the front end of the cylinder 80 is bled to the sump through the valve chamber 108, passage 120, valve chamber 106 and control valve V1 as previously set forth.

From the above description of three exemplary situations including one in which the requirement of the front cylinder is greater than that of the rear cylinder; one in which the requirement of the rear cylinder is greater than that of the front cylinder; one in which the requirements of the front and rear cylinders are equal or nearly so, it will be apparent that by the simple expedient of regulating the spring pressures acting on the balls 122 and 134 of the pressure relief valves PV1 and PV2 respectively, the desired early raising and lowering of the front end of the plow frame, followed by a delayed raising and lowering of the rear end of such frame may be attained, utilizing a single control valve in the operator's cab of the tractor.

Figure 3:
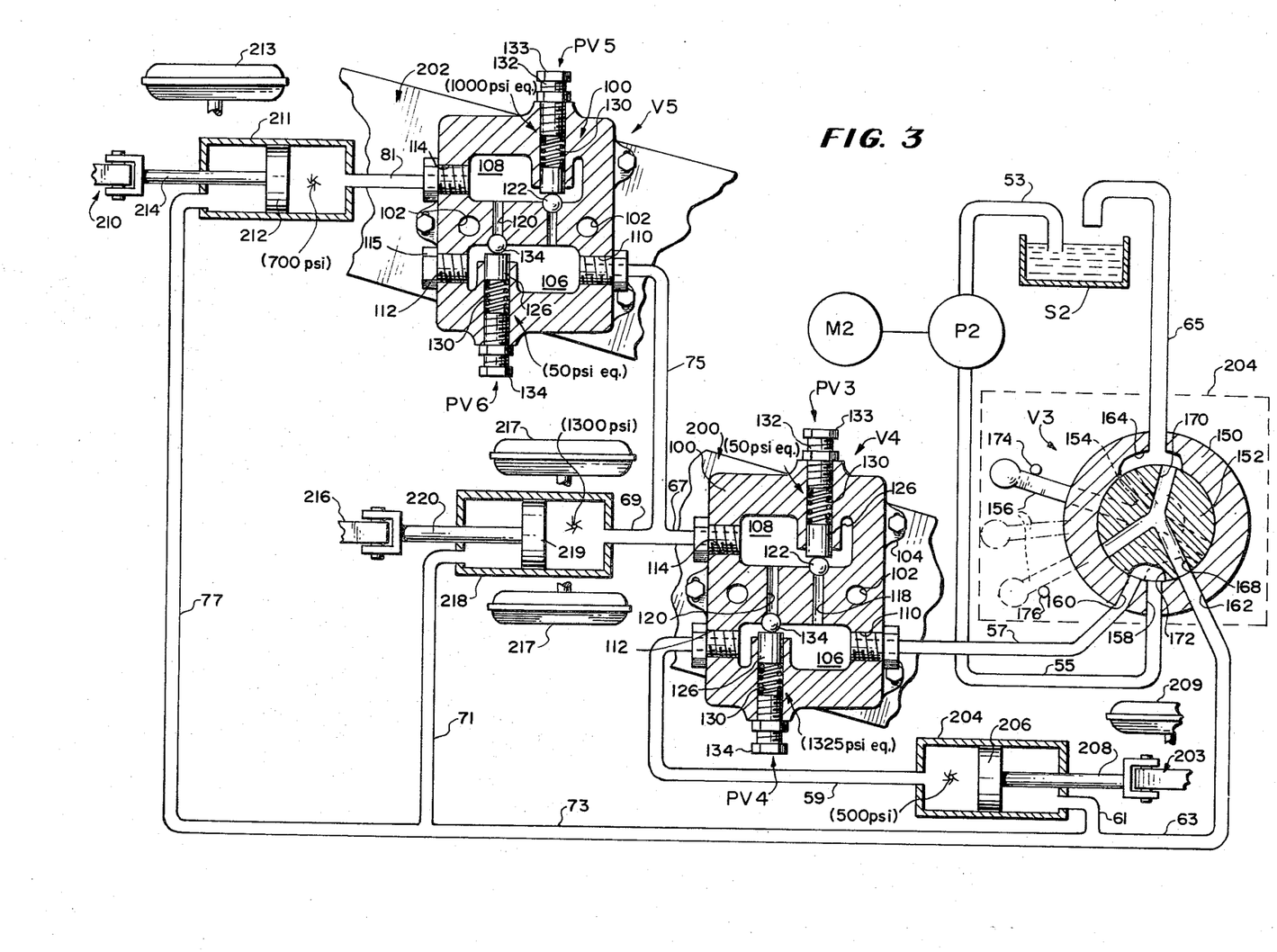
FIG. 3 is a hydraulic circuit diagram, similar to FIG. 2, showing a modified form of control system designed for use in connection with an articulated split-frame multi-bottom moldboard plow or other tandem arranged plow units.

The hydraulic system of the present invention, in a modified form thereof, is capable of use in connection with plow implements which are arranged in tandem, or with a plow implement which is provided with an articulated or split frame. Such a system would have three sets of wheels, rather than two as in the embodiment of FIGS. 1 and 2 and is schematically illustrated in FIG. 3. Reference may be made to U.S. Pat. No. 911,703, issued Feb. 9, 1909 for a showing of a tandem or flexible plow of the type schematically illustrated in FIG. 3. The FIG. 3 embodiment will provide sequential operation of the three sets of wheels. The hydraulic system of FIG. 3 could be utilized with a flexible plow of the type shown in the above referred to patent and it is not deemed necessary for descriptive purposes herein to illustrate these types of implements, it being sufficient for an understanding of the hydraulic system to point out that the two frame sections of the composite implement are flexibly connected together in end-to-end fashion to produce the tandem arrangement and that one or more supporting wheels which are disposed in the vicinity of the flexible joint have associated therewith a power lift mechanism similar to the lift mechanisms 28 and 30 and embodying a center lift cylinder which is actuated under the control of a second cushion valve similar to the cushion valve V2.

Referring now specifically to FIG. 3, a fragmentary portion of the front frame section of the composite implement in the vicinity of the flexible joint and a fragmentary portion of the rear frame section in the vicinity of the rear end thereof are illustrated. These sections are designated by the reference numerals 200 and 202 respectively. The system employs a control valve V3 which is mounted on the tractor 18 and two cushion valves V4 and V5, the former being mounted on the upper face of the frame section 200 and the latter being mounted on the upper face of the frame section 202.

The control valve V3 is identical to the previously described control valve V1 and therefore, in order to avoid needless repetition of description, identical reference numerals have been applied to the corresponding parts as between the disclosures of these two valves in FIGS. 2 and 3 respectively. Likewise the cushion valves V4 and V5 are similar to the previously described cushion valve V2 and, similarly, in order to avoid unnecessary description, identical reference numerals have been applied to the corresponding parts as between the disclosure of the valve V2 in FIG. 2 and the disclosures of the valves V4 and V5 in FIG. 3. The valve V5, when operatively installed in the modified control system, has its fluid outlet 112 closed by means of a threaded plug 115.

The power lift mechanism 203 which controls the raising and lowering movements of the front end of the front plow frame section 200 embodies a front cylinder 204 having a piston 206 and a plunger 208. The power lift mechanism 210 which controls the raising and lowering movements of the rear end of the rear plow frame section 202 embodies a rear cylinder 211 having a piston 212 and a plunger 214. The power lift mechanism 216 which controls the raising and lowering movements of the rear end of the front plow frame section 200 is associated with a pair of center wheels 217 and embodies a center cylinder 218 having a piston 219 and a plunger 220. Because the power lift mechanism 216 which is associated with the rear end of the front frame section 200 is operatively applied to the rear end of such section, its influence is carried over to the front end of the rear section 202, actuation of the center cylinder 216 thus serving to raise and lower the articulated central region of the plow implement. Obviously it is within the purview of the present invention to operatively apply the power lift mechanism 216 to the front end of the rear plow frame section 202. The three power lift mechanisms which embody the cylinders 204, 210 and 216 have not been disclosed in detail herein, only the terminal members of such mechanisms being illustrated. It will be understood however that such mechanisms are of similar construction and that they function generally in the manner of the previously described power lift mechanisms 28 and 30.

Considering now the operation of the modified form of hydraulic control system shown in FIG. 3, it is the function of the system as a whole to effect raising of the front end region, central region and rear end region of the composite two-part articulated plow frame 200, 202 successively and in the order named, as well as to effect lowering of these regions in a similar sequential manner. Accordingly, for plow frame raising purposes, the operator will place the lever 156 of the control valve V3 in its full line position against the abutment 176, whereupon hydraulic fluid will be withdrawn from the sump S2 and conducted through fluid line 53, pump P2, line 55, valve V3, line 57, chamber 106 of the cushion valve V4 and line 59 to the rear end of the cylinder 204. As shown by the labeling, the cylinder 204 has a pressure requirement of 500 psi and, therefore, when the pressure in the chamber builds up to this amount the resistance of the cylinder 204 is overcome and the piston 206 and plunger 208 commence their forward movement, thus raising the front end of the frame section 200. The fluid in the front end of the cylinder 204 flows through line 63, control valve V3, and line 65 back to the sump S2. At such time as the pressure in the chamber 106 of the valve V4 reaches the total equivalent pressure maintained on the ball 122, namely 1,350 psi which represents the 1,300 pressure requirement of the center cylinder 218 plus the 50 psi equivalent spring pressure of the pressure relief valve PV3, fluid is forced into the chamber 108 where it ultimately builds up to the 1,300 psi requirement of the center cylinder 218 and flows through fluid lines 67, 69 and into the front end of the cylinder 218 so as to project the piston 219 and plunger 220 of such cylinder, thus actuating the power lift mechanism 216 and raising the central region of the plow implement. Fluid in the rear end of the center cylinder 218 returns to the sump S2 through lines 71, 73, 63, valve V3, and line 65.

After the piston 219 moves to its extreme rear portion, pressure builds up in the chamber 108 of the valve V4 and flows through lines 67, 75 and pressurizes the chamber 106 of the valve V5, the pressure builds up until it reaches the 700 psi pressure requirement of the rear cylinder 211 plus the 1,000 psi equivalent spring pressure exerted on the ball 122 of the valve V5 (totaling 1,700 psi), after which the power lift mechanism 210 is actuated to raise the rear end of the rear frame section 202. Fluid in the rear end of the cylinder 211 returns to the sump S2 through lines 77, 73, 63, valve V3 and line 65.

In order to lower the composite plow frame, the operator will shift the lever 156 of the valve V3 to its dotted line position against the stop 166, thus draining the chamber 106 of the valve V4 through line 57, valve V3 and line 65. Pressure is thus relieved in the rear end of the front cylinder 204 so that the piston 206 moves rearwardly to lower the front end of the forward frame section 200. When the piston 206 reaches the end of its rearward movement, pressure builds up in the lines 63, 73 and is applied to the rear end of the center cylinder 218 until it overcomes the 1,325 psi equivalent spring pressure exerted by the pressure relief valve PV4 of the cushion valve V4 and, at this time, the piston 219 and plunger 220 move forwardly so as to actuate the power lift mechanism 216 and lower the rear end of the front frame section 200 and consequently the center region of the composite plow frame as a whole.

After retraction of the plunger 220, pressure in the lines 63, 73, 77 continues to build up until, in combination with the 700 psi pressure required of the cylinder 211, it overcomes the 1,325 psi equivalent spring pressure exerted by the pressure relief valve PV4 and the 50 psi exerted by PV6 which continues to hold pressure in the chambers 106 of both valves V4 and V5. The piston 212 and plunger 214 of the rear cylinder 211 then move forwardly so as to actuate the power lift mechanism 210 and lower the rear end of the rear frame section 202. Fluid which is forced from the front end of the cylinder 211 unseats the balls 134 of both valves V5 and V4 and such fluid is returned to the sump S2 from the cylinder 211, through line 81, valve V5, line 75, valve V4, line 57, control valve V3 and line 65.

From the foregoing description it will be apparent that by selectively manually shifting the position of the control lever 156 of the single control valve V3 between the two extreme positions of which it is capable of assuming, the desired vertical movements of the front, center and rear regions of the composite split or articulated frame bar 200, 202 sequentially and in the order named may be effected both as regards plow bottom raising and plow bottom lowering functions. Furthermore, it will be readily appreciated that by effecting various adjustments of the pressures which are exerted by the springs 130 which are associated with the pressure relief valves PV3, PV4, PV5 and PV6 of the cushion valves V4 and V5, the desired sequence of vertical movements of the front, center and rear portions of the composite frame may be maintained and yet accommodate implements which vary in their weight, as well as in their weight distribution.

Although this invention is disclosed in the environment of moldboard plows it can of course be utilized with any type of equipment wherein it is desirable to operate hydraulic cylinders in the sequence provided for by this invention. For example, various farm equipment tools such as disk harrows, plows, and grain drills are often used in combination and are towed in tandem. The subject invention could be utilized to sequentially operate such tools when used in combination or to sequentially operate different components of a machine.

The invention is not to be limited to the exact arrangement of parts shown in the accompanying drawings or described in this specification as various changes in the details of construction may be resorted to without departing from the spirit of the invention. Therefore, only insofar as the invention has particularly been pointed out in the accompanying claims is the same to be limited.

What is claimed is:

1. In a hydraulic control system for tractor-impelled plow implements, in combination, a tractor, a plow implement operatively connected to the tractor in trailing relationship, said implement embodying a vertically shiftable plow frame, a series of longitudinally spaced plow units carried by said frame and movable bodily therewith, said frame being movable between a normal lowered operative position wherein the plow units are in effective plowing engagement with the ground, and a raised inoperative transport position, first and second furrow wheels, said second furrow wheel located rearwardly of said first furrow wheel and said wheels assimilating at least a portion of the weight of said plow frame, a front power lift cylinder effective between the first furrow wheel and frame and operable when supplied with fluid to raise the front end of the frame, a rear power lift cylinder effective between the second furrow wheel and frame and operable when supplied with fluid to raise the rear end of the frame, said cylinders having power requirements commensurate with the weight distribution of the frame, valve means defining a first valve chamber having a fluid inlet and a fluid outlet, and a second valve chamber having a fluid outlet, the fluid outlet of the first valve chamber being connected to the front power lift cylinder, the fluid outlet of the second valve chamber being connected to the rear power lift cylinder, first and second fluid passages extending between said chambers and establishing communication therebetween, a first unidirectional pressure relief valve effective when a predetermined pressure differential within said chambers is attained to admit fluid from the first chamber to the second chamber through said first passage, a second unidirectional pressure relief valve effective when a determined pressure predetermined within said chambers is attained to admit fluid from the second chamber to the first chamber through said second passage, and a multi-position control valve on the tractor, connected to the fluid inlet of the first valve chamber, effective in a frame-raising position to supply fluid under pressure to said fluid inlet, and in a frame-lowering position to relieve fluid pressure in said first valve chamber.

2. In a hydraulic control system, the combination set forth in claim 1, wherein said valve means is in the form of a unitary valve structure embodying a valve body defining said first and second valve chambers and separated by a partition wall, the first and second fluid passages are in the form of transverse bores which extend through said partition wall, the first pressure relief valve is comprised of a valve element disposed within said second valve chamber and designed for seating engagement against the adjacent end of said first bore, and spring pressure means yieldingly urging said valve element against said end of the first bore, and said second pressure relief valve is comprised of a valve element disposed within said first valve chamber and designed for seating engagement with the adjacent ends of the second bore, and spring pressure means yieldingly urging said latter valve element against said end of the second bore.

3. In a hydraulic control system, the combination set forth in claim 2 including, additionally, means for regularly varying the effective pressure of said spring means.

4. In a hydraulic control system, the combination set forth in claim 3, wherein said valve elements are, in addition to the spring pressure thereon, responsive to the pressure of fluid within the respective valve chambers in which they are disposed.

5. In a hydraulic control system for tractor-impelled implements, in combination, a tractor, a plow implement operatively connected to the tractor in trailing relationship, said implement embodying a composite articulated plow frame consisting of front and rear frame sections disposed in end-to-end relationship and pivoted together for flexing of the composite frame in the medial region thereof, a series of longitudinally spaced plow units on each frame section and movable bodily therewith, said frame being movable between a normal lowered operative position wherein said plow units are in effective plowing engagement with the ground, and a raised inoperative transport position, a front furrow wheel adjacent the front end of the front plow section, a rear furrow wheel adjacent the rear end of the rear plow section, a center wheel adjacent the pivotal connection between said frame sections, a front power lift cylinder effective between the front furrow wheel and front frame section and operable when supplied with fluid to raise the front end of such frame section, a rear power lift cylinder effective between the rear furrow wheel and rear frame section and operable when supplied with fluid to raise the rear end of the rear frame section, and a center power lift cylinder effective between the medial region of the composite plow frame and center wheel and operable when supplied with fluid to raise such medial region, such cylinders having pressure requirements commensurate with the weight distribution of said composite frame, a fluid pump, a first valve structure having a first fluid inlet connected to the discharge side of said pump, a first fluid outlet connected to said front cylinder, and a second fluid outlet, a second valve structure having a fluid outlet connected to the rear cylinder, and a fluid inlet connected to the second fluid outlet of the first valve structure, said first fluid inlet and outlet of said first valve structure being in direct communication to automatically effective incident to the development of fluid pressure at the fluid inlet thereof equivalent to the power requirement of the front cylinder to supply fluid to said first fluid outlet to actuate the front cylinder and thus raise the front end of the front plow frame section, said first valve means including pressure sensitive means effective incident to the development of fluid pressure at the latter fluid inlet thereof which is predeterminedly higher than the pressure requirement of the center cylinder to supply fluid to said second fluid outlet, said second valve structure including pressure sensitive means causing it to be automatically effective incident to the development of fluid pressure at the fluid inlet port thereof equal to the power requirement of the rear cylinder to supply fluid to the fluid outlet thereof and thus actuate such cylinder and raise the rear end of the rear plow frame section.

6. In a hydraulic control system, the combination set forth in claim 5 including, additionally, a control valve interposed between the discharge end of said pump and effective in a first position to establish the connection between the pump and the fluid inlet of the first valve structure, and in a second position to relieve fluid pressure at said inlet.

7. In a hydraulic control system, the combination set forth in claim 6, wherein each of said cylinders is of the dual-acting type and includes a piston with cylinder ports on opposite sides thereof, one port of the front cylinder is connected to the fluid outlet of the first valve structure, one port of the rear cylinder is connected to the fluid outlet of the second valve structure, and one port of the center cylinder is connected to the second fluid outlet of the first valve structure, and the control valve is effective in its second position to supply fluid to the other port of each cylinder.

8. In a hydraulic control system for tractor-impelled farm equipment, in combination, a tractor, a farm implement operatively connected to the tractor in trailing relationship, said implement embodying vertically shiftable first and second frame portions, ground working tools carried by said frame portions and movable bodily therewith, said frame portions being movable between a normal lowered operative position wherein said tools carried thereby are in effective working engagement with the ground, and a raised inoperative transport position, a first wheel supporting said first frame portion and a second wheel supporting said second frame portion, said wheels assimilating at least a portion of the weight of the frame portions, a first power lift cylinder effective between the first wheel and first frame portion and operable when supplied with fluid to raise the front end of the frame, a second power lift cylinder effective between the second wheel and second frame portion and operable when supplied with fluid to raise the rear end of the frame, said cylinders having power requirements commensurate with the weight distribution of said frame, a fluid pump, valve means having a fluid inlet connected to the discharge side of said pump, said valve means having a first fluid outlet connected to said first cylinder, and a second fluid outlet connected to said second cylinder, said valve means being automatically effective incident to the development of fluid pressure at said fluid inlet equal to the power requirement of the first cylinder to supply fluid to said first fluid outlet to the exclusion of the second fluid outlet and thus actuate the first cylinder for first frame portion raising purposes, and effective incident to the development of fluid pressure at said fluid inlet which is predeterminedly higher than the pressure requirement of the second cylinder to supply fluid to said second fluid outlet and thus actuate the second cylinder for second frame portion raising purposes, means in said valve means permitting fluid flow from said second outlet to said inlet only upon development of a predetermined pressure differential therebetween.

9. In a hydraulic control system, the combination set forth in claim 8 including, additionally, a control valve interposed between the discharge end of said pump and the fluid inlet of said valve means and effective in a first position to establish the connection between the pump and said fluid inlet, and in a second position to relieve fluid pressure at said inlet.

10. In a hydraulic control system, the combination set forth in claim 9, wherein each of said cylinders is of the dual-acting type and includes a piston with cylinder ports on opposite sides thereof, one port of the first cylinder is connected to said first fluid outlet, one port of the second cylinder is connected to the second fluid outlet, and the control valve is effective in its second position to supply fluid to the other port of each cylinder.

* * * * *